United States Patent [19]

Bernard

[11] Patent Number: 5,093,434
[45] Date of Patent: Mar. 3, 1992

[54] SEALING OF CONTAINERS

[75] Inventor: Pierre-Marie Bernard, Cambridgeshire, England

[73] Assignee: W. R. Grace & Co.-Conn., New York, N.Y.

[21] Appl. No.: 508,028

[22] Filed: Apr. 11, 1990

[30] Foreign Application Priority Data

Apr. 19, 1989 [GB] United Kingdom ............... 8908885

[51] Int. Cl.$^5$ .......................................... C08F 8/42
[52] U.S. Cl. ............................ 525/366; 525/329.5; 525/329.6; 525/330.2; 525/367; 525/368; 525/369; 525/370; 525/371; 525/372; 525/373
[58] Field of Search ............... 525/366, 367, 368, 369, 525/370, 371, 372, 373

[56] References Cited

U.S. PATENT DOCUMENTS

| | | | |
|---|---|---|---|
| 3,301,806 | 1/1967 | Guziak et al. | 526/318.25 |
| 4,257,935 | 3/1981 | Sekiguchi et al. | 526/318.25 |
| 4,438,232 | 3/1984 | Lee | 526/318.25 |

FOREIGN PATENT DOCUMENTS

| | | |
|---|---|---|
| 0022967 | 1/1981 | European Pat. Off. |
| 0182674 | 5/1986 | European Pat. Off. |
| 2084600 | 4/1982 | United Kingdom |
| 2084601 | 4/1982 | United Kingdom |

OTHER PUBLICATIONS

Abstract, Derwent WPIL, No. 86-214724(33), Derwent Publications Ltd., GB; JP-A-61-145,273, 02, 07—1986.

*Primary Examiner*—Bernard Lipman
*Attorney, Agent, or Firm*—John Dana Hubbard; William L. Baker

[57] ABSTRACT

This invention relates to compositions comprising an elastomeric material based on a styrene-butadiene-alkyl (meth) acrylate copolymer also including an ethylenically unsaturated carboxylic acid.

The compositions are used for forming a sealing gasket for a container that contains an organic solvent, by crosslinking with a polyvalent metal crosslinking agent, and preferably also a vulcanizing crosslinking agent.

The preferred ethylenically unsaturated carboxylic acid is itaconic acid.

13 Claims, No Drawings

SEALING OF CONTAINERS

BACKGROUND OF THE INVENTION

In order to improve sealing performance, it is standard practice to provide a sealing gasket in containers between surfaces that are to seal against one another. For instance a gasket may be provided in the double seam at both ends of a fixed head drum or a gasket may be lined on to a can end that is to be used for closing a can. These sealing gaskets are conventionally deposited from liquid sealing compositions that are lined on to closure or other surface that is to carry the gasket and are dried on the surface, optionally with heating. The gasket must adhere well to the surfaces between which it is to provide a seal, must be cohesive, and must be sufficiently elastomeric to provide a good seal. The composition always includes elastomeric material, and optionally filler, and the choice of elastomeric material greatly influences the performance of the gasket.

A very large number of polymeric materials have been proposed in the literature for use as elastomeric material. One that is very widely used (especially in latex-based compositions) is styrene butadiene, that is often carboxylated as a result of the inclusion of a small amount of carboxylic monomer. This can give good results when the container is to be filled with a conventional aqueous composition, such as fruit, vegetables or beverages. However it is less satisfactory when the composition is to contain fat or oil, for instance fatty meat, chicken soup or product containing vegetable oil.

We have described in EP 182674 that, when the gasket is to be used for such a filling, improved results are obtained if the elastomeric material comprises a copolymer of styrene and an acrylic ester. The exemplified polymer is formed from 3% acrylic acid, 47% styrene and 50% butyl acrylate. A comparison polymer was formed from 2.5% methacrylic acid, 51% styrene, 26.5% butadiene and 20% butyl acrylate. These two polymers were subjected to two series of tests with and without cross linking with a vulcanising agent. In one series their sealing performance was evaluated both with a conventional aqueous filling and with a filling containing 2% vegetable oil. In another test, an open oil immersion test is conducted to determine the effect on a gasket of the gasket being immersed in olive oil at 90° C. for two hours. In each instance, the comparative styrene-butadiene-acrylic ester polymer was found to be inferior to the styrene-acrylic ester polymer. Vulcanisation was shown to be relatively insignificant.

Although the styrene-acrylate copolymers can be used successfully when the container is to be filled with a filling containing an edible fat or oil, they have proved unsuccessful when the filling is to include an industrial organic solvent, for instance mineral oil or toluene or other hydrocarbon based solvent of the type that is included in, for instance, paint thinners.

In order to achieve satisfactory results, the copolymers must have good adhesion, cohesion and chemical resistance and if even one of these properties is weak then the copolymer will be unsuccessful as a sealing composition for containers holding organic solvents as described above.

SUMMARY OF THE INVENTION

We have surprisingly found that good performance can be obtained in the presence of such compositions when the elastomer is based on a particular type of styrene-butadiene-alkyl (meth) acrylate copolymer and is cross linked in the gasket by a particular mechanism. Such gaskets surprisingly give superior properties compared to any of the compositions described in EP 182674.

DETAILED DESCRIPTION OF THE INVENTION

In a first aspect of the invention, a liquid container-sealing composition includes elastomeric material and is for use for forming a sealing gasket for a container that contains an organic solvent, and the elastomeric material includes a copolymer of styrene, butadiene, alkyl (meth) acrylate and ethylenically unsaturated carboxylic acid which is itaconic acid (as free acid or suitable salt) and the composition includes an effective amount of polyvalent metal crosslinking agent for crosslinking the copolymer through the carboxylic groups during drying of the gasket.

An important feature of the invention is that the composition should be crosslinked after it is deposited as a gasket and part at least of this crosslinking is through the carboxylic acid groups by a polyvalent metal compound. Polyvalent metal compounds that will cross link through carboxylic groups are known and include compounds of metals such as aluminum and iron but the preferred is a zirconium compound. Preferably the crosslinker is present in the liquid composition in an inactive form that can be activated by heating. Thus it can be present in the form of a complex that prevents interaction with the carboxylic groups but which liberates the zirconium or other polyvalent metal crosslinker upon heating. A suitable material is ammonium zirconium carbonate as a tartaric acid or other complex, for instance, a material such as is sold under the Trademark Bacote 20 by Magnesium Electron Limited of Twickenham, England.

Preferably, vulcanising agent for crosslinking through the butadiene groups is also included in the composition and this can be for instance any suitable sulphur-based or other crosslinker for crosslinking butadiene groups.

Part or all of the carboxylic crosslinker may be added to the composition as part or all of a vulcanising system, thereby providing both carboxylic and butadiene cross-linking.

It has surprisingly been found that the use of a combination of both types of crosslinkers gives improved properties to compositions that are as described above, except that the itaconic acid is replaced with other carboxylic acids.

Therefore, according to a second aspect of the invention there is a liquid container-sealing composition including elastomeric material which is for use for forming a sealing gasket for a container that contains an organic solvent and the elastomeric material includes a copolymer of styrene, butadiene, alkyl (meth) acrylate and ethylenically unsaturated carboxylic acid (or salt thereof) and the composition includes an effective amount of a polyvalent metal crosslinking agent for crosslinking the copolymer through the carboxylic groups and a vulcanising agent for crosslinking through the butadiene groups during drying of the gasket.

Thus it has surprisingly been found that it is possible to formulate compositions using copolymers such that they give good sealing performance when the container is being used for holding an industrial solvent of this type, despite the relatively poor performance of one particular butadiene-styrene-alkyl acrylate copolymer in the olive oil immersion test described in EP 182674.

Preferred copolymers are formed from 20 to 60% by weight styrene. The amount of styrene may be up to 50 or 55% but is preferably below 48%. It is generally at least 30%. All percentages are by weight based on total monomers used for forming the polymer. The amount of butadiene typically is from 20 to 60%. It is generally at least 30% but is usually not more than 50%. The amount of alkyl (meth) acrylate is generally from 10 to 50%. It is usually at least 15% but is generally not more than 30%.

The ethylenically unsaturated carboxylic acid is typically added to the monomers from which the copolymer is formed at from 0.2 to 10%.

Although it is possible to include small amounts, generally less than 20% and preferably less than 10%, of other monomers in the monomer mixture from which the copolymer is formed, preferably the mixture is free of other monomers.

The alkyl group of the methacrylate typically contains 1 to 8, usually 2 to 8 and most preferably 3 to 5 carbon atoms, the (meth) acrylate most preferably being an acrylate. A preferred acrylate is butyl acrylate.

The ethylenically unsaturated carboxylic acids may be present as free acid or, usually as water soluble alkali metal, ammonium or other suitable salt. Ethylenically unsaturated carboxylic acids include (meth) acrylic acid, fumaric acid, crotonic acid and itaconic acid, the latter being preferred.

The liquid composition may be in any conventional form suitable for use as container sealants but preferably is a water-based composition and, most preferably, the composition is a water-based composition based on a latex of the defined copolymer. Thus a latex of that copolymer is blended with other conventional additives and additional water (if required) in conventional manner. The defined copolymer is preferably the only elastomeric material in the composition but blends of the copolymer with other elastomers can be used, the other elastomers generally being present as a minor proportion of the blend. Suitable elastomers that may be used for this purpose include styrene-alkyl (meth) acrylate copolymers or, preferably natural rubber or styrene butadiene rubber (which preferably is carboxylated).

The total amount of elastomeric material in the liquid composition is generally in the range 10 to 50% by weight of the total composition or 20 to 80%, generally 30 to 60%, by weight of the solids content of the composition.

The main other component in the composition is generally a filler, typically present in an amount of from 20 to 70%, most preferably 30 to 60% by weight of the solids content of the composition. Typical fillers are talc and kaolin but any of the conventional fillers for use in container sealing compositions may be used.

The composition may include a tackifying resin of the type and in amounts conventional for sealing such material. The composition may include other conventional additives for such compositions including, for instance, stabilisers, viscosifiers, bactericides, corrosion inhibitors, wetting agents, chelating agents, defoamers, antioxidants and pH adjusters. Typical materials are well known and are mentioned in, for instance, EP 182674.

The total solids content of the liquid composition is generally from 20 to 70%, typically 30 to 60%, by weight with the balance being water.

It is of course necessary to formulate the composition and select the copolymer so as to optimise the sealing performance having regard to the particular filling that is to be in the container. In particular, when choosing the copolymer and the amount and type of cross linking system, it is necessary to achieve a good combination of adhesion to the substrate, cohesion within the gasket, and chemical resistance (resistance to swelling) upon exposure to the solvent. It is easily possible to achieve this in accordance with the invention.

A convenient way of determining whether the liquid composition is capable of giving an effective seal for contact with any particular solvent is by an open immersion test as defined below. In the invention, the adhesion, cohesion and chemical resistance in this test should change by a value of not more than 2 each and not more than 5 in aggregate when tested against toluene. Preferably the aggregate is not more than 4 and most preferably each of the values changes by not more than 1.

This open immersion test is performed by spreading parallel strips of the liquid composition using a 0.45x10 mm film spreader on to tin plate drying the film at 90° C. for 8 minutes, examining each strip and assessing its properties, inserting each strip into a glass jar containing 2 cm depth of toluene, storing the jars at room temperature for 1 day, and then examining the film at room temperature while still wet. The change in adhesion, the change in cohesion and the change in swelling and softening properties (chemical resistance) are each recorded on a scale of 0 to 4, where 0 indicates no change and 4 is extremely bad, with 1 being slight change and 2 being moderate change.

In use, the composition is deposited on the chosen surface in conventional manner. The container may be a cylindrical can in which event the composition may be lined on to the can end. Alternatively the can may be rectangular or other shape in which event the composition is lined on to a non-circular end in conventional manner. The container may be a pail (for instance a paint can) or drum. If it is a pail then the gasket formed from the composition is generally in the double seam at the top and bottom. If it is a drum the gasket will be in the double seam at both ends if it is a fixed head drum, but if it is a removable head drum the gasket will be in the double seam at the closed end and will be a gasket in the removable cover.

After depositing the liquid composition on the desired surface in conventional manner, the composition is then dried with sufficient heating to effect the cross linking reaction or reactions, typically by heating at least 70° C. and often at least 80° C., but usually below 100° C. and often below 90° C. for sufficient time for drying and cross linking to occur, generally at least 1 minute and usually at least 3 minutes but generally below 15 minutes and typically below 10 minutes, and most preferably 4 to 6 minutes.

The invention includes containers and closures incorporating a gasket formed from the composition. The containers can be filled with wholly aqueous compositions or with compositions containing edible oil, but preferably the container is filled with a composition containing an organic solvent. This composition may be a mineral oil, a hydrocarbon-based solvent, a paint thinner or a paint (usually an oil-based paint) or other composition containing an aggressive organic solvent.

EXAMPLE 1

A composition was formed from 100 parts rubbery copolymer, introduced as a latex, 100 parts china clay, 5 parts propylene glycol, 0.7 parts crosslinker system Y, (0.3 parts zinc dibutyl dithiocarbamate, 0.4 parts dipentamethylene thiuram hexasulphide), together with conventional additives such as wetting agent, antioxidant, bactericide, chelating agent, corrosion inhibitor, defoaming agent and carbon black, in a total amount of less than about 5 parts. The composition has a total solids content of about 40%.

Three such compositions were formulated. Composition A used, as the latex, a latex of carboxylated styrene butadiene. Composition B used a latex of carboxylated styrene-butyl acrylate copolymer. Composition C, according to the invention, used a latex formed from 42.5% styrene, 35% butadiene, 20% butyl acrylate and 2.5% itaconic acid. Product C also contained 1.2 zirconium dioxide introduced as Bacote 20 (crosslinker system X).

The three compositions were subjected to a toluene open immersion test as described above to indicate the performance when the compositions were cross linked. As a comparison, the experiment was repeated with Product C but with the only crosslinker X, so as to observe performance when the compositions were not cross linked through the butadiene groups. The results are shown in Table 1 below.

TABLE 1

| | Without Cross Linker Y | | | With Cross Linker Y | | |
|---|---|---|---|---|---|---|
| Product | Adhesion | Cohesion | Chemical Resistance | Adhesion | Cohesion | Chemical Resistance |
| A | 1 | 4 | 4 | 3 | 4 | 4 |
| B | 0 | 4 | 4 | 0 | 4 | 4 |
| C | 1 | 2 | 2 | 1 | 1 | 1 |

This demonstrates the improved properties of composition C according to the invention over other polymeric compositions and the increased improved performance when both crosslinkers are used.

EXAMPLE 2

The above experiment was repeated using compositions of latex to which additives as described in Example 1 are incorporated. Composition Q used a latex of carboxylated styrene butadiene and R used a latex of carboxylated styrene butyl acrylate copolymer. Composition S was according to the invention, comprising a latex of 42.5% styrene, 35% butadiene, 20% butyl acrylate and 2.5% itaconic acid and composition T, also according to the invention comprising a latex of 42.5% styrene, 35% butadiene, 20% butyl acrylate and 2.5% methacrylic acid.

These compositions were tested for performance with crosslinker systems X (in an amount to give 1 part zirconium dioxide) and/or Y (in an amount of 0.7 parts) as described in Example 1 and/or crosslinker Z which comprises an alternative sulphur crosslinking system with a sufficiently high metal concentration that it also acts as a carboxylate crosslinker and comprises 2.0 parts zinc dibutyl dithio carbomate and 0.5 parts sulphur.

The performance results for the toluene immersion test are given in Table 2

TABLE 2

| | Crosslinking System. | | | | | | | | | | | | | | | | | |
|---|---|---|---|---|---|---|---|---|---|---|---|---|---|---|---|---|---|---|
| | None | | | X | | | Y | | | Z | | | X + Y | | | X + Z | | |
| Product | Ad | Co | CR | Ad | Co | CR | Ad | Co | CR | Ad | Co | CR | Ad | Co | CR | Ad | Co | CR |
| Q | 3 | 4 | 3 | 2 | 4 | 3 | 3 | 4 | 2 | 3 | 3 | 2 | 3 | 2 | 2 | 3 | 3 | 2 |
| R | 0 | 4 | 4 | 0 | 4 | 1 | 0 | 4 | 4 | 0 | 4 | 2 | 0 | 4 | 1 | 0 | 3 | 0 |
| S | 3 | 4 | 1 | 2 | 2 | 1 | 3 | 3 | 1 | 2 | 2 | 1 | 2 | 2 | 0 | 2 | 2 | 0 |
| T | 1 | 4 | 2 | 2 | 4 | 2 | 1 | 4 | 2 | 2 | 3 | 2 | 2 | 2 | 1 | 2 | 2 | 1 |

Ad = Adhesion
Co = cohesion
CR = Chemical resistance.

This table clearly shows the surprising benefit of products S and T with combinations of olyvalent metal and vulcanising crosslinkers compared to products Q and R with or without any crosslinker and T without a crosslinker or with only a non metallic vulcanising agent crosslinker (Z) or with only metallic crosslinker (X).

The results also show the benefit of product S with a non metallic crosslinker alone.

The good results shown for the itaconic acid product (S) with the sulphur crosslinking agent Z alone might appear to be anomalous but is thought to be due to the relatively high zinc content of the crosslinking system Z so that the system also includes metallic crosslinker.

While the present invention has been described with reference to its preferred embodiments, other modifications can achieve the same result. Variations and modifications of the present invention will be obvious to those skilled in the art and it is intended in the appended claims to cover all such modifications and equivalents as fall within the true spirit and scope of this invention.

What is claimed:

1. A liquid container-sealing composition that includes elastomeric material and that is for use for forming a sealing gasket for a container that contains an organic solvent comprising an elastomeric material formed of a copolymer of styrene, butadiene and alkyl (meth) acrylate and an ethylenically unsaturated carboxylic acid wherein the acid is itaconic acid, and the composition includes an effective amount of a polyvalent metal cross linking agent for cross linking the copolymer through the carboxylic groups during drying of the gasket.

2. A composition according to claim 1 further comprising a vulcanising agent for crosslinking the copolymer through the butadiene groups.

3. A liquid container-sealing composition that includes elastomeric material and that is for use for forming a sealing gasket for a container that contains an organic solvent comprising an elastomeric material of a copolymer of styrene, butadiene, alkyl (meth) acrylate and ethylenically unsaturated carboxylic acid, and effective amounts of a polyvalent metal cross linking agent for crosslinking the copolymer through the carboxylic groups and a vulcanising agent for crosslinking the copolymer through the butadiene groups during drying of the gasket.

4. A composition according to claim 3 wherein the ethylenically unsaturated carboxylic acid is itaconic acid.

5. A composition according to claim 3 wherein the copolymers is formed from 30 to 48% styrene, 30 to 50% butadiene, 15 to 30% alkyl (meth) acrylate and 0.2 to 10% ethylenically unsaturated carboxylic acid.

6. A composition according to claim 3 wherein the alkyl (meth) acrylate is butyl acrylate.

7. A composition according to claim 3 wherein part or all of the polyvalent metal cross-linker is part or all of a vulcanising agent for crosslinking through the butadiene groups.

8. A composition according to claim 3 wherein the polyvalent metal crosslinker is present in an inactive form that is activated by heating.

9. A liquid container-sealing composition comprising an elastomeric material in latex form comprised of a copolymer of styrene, butadiene, alkyl (meth) acrylate and an ethylenically unsaturated carboxylic acid, an effective amount of a polyvalent metal crosslinking agent for crosslinking the copolymer the carboxylic groups such that when the composition is subjected to an open sealing test using toluene, the values for adhesion, cohesion and chemical resistance, each change by not greater than 2 and in the aggregate of all three values not greater than 5.

10. A liquid container-sealing composition comprising a copolymer of styrene, butadiene, alkyl (meth) acrylate and an ethylenically unsaturated carboxylic acid; a polyvalent metal cross linking agent, the metal being selected from the group consisting of zirconium, iron and aluminum, the polyvalent metal cross linking agent being present in an amount sufficient to crosslink the copolymer through the carboxylic acid during drying of the composition.

11. The composition of claim 10 wherein the polyvalent metal crosslinking agent is selected from the group consisting of ammonium zirconium carbonate and zirconium dioxide.

12. A liquid container-sealing composition comprising a copolymer of styrene, butadiene, alkyl (meth) acrylate and an ethylenically unsaturated carboxylic acid; a polyvalent metal cross linking agent, the metal being selected from the group consisting of zirconium, iron and aluminum, the polyvalent metal cross linking agent being present in an amount sufficient to crosslink the copolymer through the carboxylic acid during drying of the composition; and a vulcanising agent for crosslinking the copolymer through the butadiene groups during drying of the composition.

13. The composition of claim 12 wherein the polyvalent metal cross linking agent is selected from the group consisting of ammonium zirconium carbonate and zirconium dioxide; and the vulcanising agent is selected from the group consisting of zinc containing and sulphur containing compounds.

* * * * *